United States Patent
Maker et al.

(10) Patent No.: US 11,799,263 B2
(45) Date of Patent: Oct. 24, 2023

(54) ELECTRO-OPTIC MODULATOR

(71) Applicant: M SQUARED LASERS LIMITED, Glasgow (GB)

(72) Inventors: Gareth Thomas Maker, Glasgow (GB); Graeme Peter Alexander Malcolm, Glasgow (GB); Simon Munro, Glasgow (GB)

(73) Assignee: M Squared Lasers Limited, Glasgow (GB)

( * ) Notice: Subject to any disclaimer, the term of this patent is extended or adjusted under 35 U.S.C. 154(b) by 800 days.

(21) Appl. No.: 16/624,574

(22) PCT Filed: Jun. 13, 2018

(86) PCT No.: PCT/GB2018/051621
§ 371 (c)(1),
(2) Date: Dec. 19, 2019

(87) PCT Pub. No.: WO2019/002820
PCT Pub. Date: Jan. 3, 2019

(65) Prior Publication Data
US 2020/0127436 A1    Apr. 23, 2020

(30) Foreign Application Priority Data

Jun. 29, 2017   (GB) ..................... 1710423

(51) Int. Cl.
*H01S 3/108*        (2006.01)
*H01S 3/08022*    (2023.01)
(Continued)

(52) U.S. Cl.
CPC ............ *H01S 3/108* (2013.01); *H01S 3/0816* (2013.01); *H01S 3/08027* (2013.01);
(Continued)

(58) Field of Classification Search
CPC .. H01S 3/108; H01S 3/08027; H01S 3/08036; H01S 3/0816; H01S 3/1062;
(Continued)

(56) References Cited

U.S. PATENT DOCUMENTS 3,965,439 A  *  6/1976  Firester .................. H01S 3/115
                                                    372/100
5,235,605 A      8/1993  Rines et al.
(Continued)

FOREIGN PATENT DOCUMENTS

CN          20121201 U      1/2012
CN          103676218 A     3/2014
(Continued)

OTHER PUBLICATIONS

International Search Report from PCT/GB2018/051621 dated Sep. 3, 2018.
UK Search and Examination Report dated Jul. 1, 2019.

*Primary Examiner* — Xinning (Tom) Niu
(74) *Attorney, Agent, or Firm* — FisherBroyles, LLP

(57) ABSTRACT

An electro-optic modulator (EOM) for altering an optical path length of an optical field is described. The EOM comprises first and second Brewster-angle cut nonlinear crystals having a first and second optical axis. The optical axes are orientated relative to each other such that when an optical field propagates through the nonlinear crystals it experiences no overall deviation. The nonlinear crystals are also arranged to be opposite handed relative to the optical field. The EOM has the advantage that its optical losses are lower when compared with those EOMs known in the art. In addition, the EOM can be inserted into, or removed from, an optical system without any deviation being imparted onto the optical field. This reduces the levels of skill and effort required on the part of an operator. The described method (Continued)

and apparatus for mounting the nonlinear crystals also suppresses problematic piezo-electric resonances within the nonlinear crystals.

32 Claims, 4 Drawing Sheets

(51) Int. Cl.
H01S 3/08036 (2023.01)
H01S 3/081 (2006.01)
H01S 3/106 (2006.01)
H01S 3/107 (2006.01)
H01S 3/16 (2006.01)
H01S 3/0941 (2006.01)

(52) U.S. Cl.
CPC .......... H01S 3/08036 (2013.01); H01S 3/107 (2013.01); H01S 3/1062 (2013.01); H01S 3/1625 (2013.01); H01S 3/1636 (2013.01); H01S 3/0941 (2013.01)

(58) Field of Classification Search
CPC ...... H01S 3/107; H01S 3/1625; H01S 3/1636; H01S 3/0941; H01S 3/08031; H01S 3/083; H01S 3/094038; H01S 3/105; H01S 3/02; H01S 3/05; H01S 3/06; H01S 3/0615; G02B 7/18; G02F 1/0322; G02F 1/3501; G02F 1/3551; G02F 1/3553; G02F 1/3505; G02F 1/3507; G02F 1/3509; G02F 2202/20
See application file for complete search history.

(56) References Cited

U.S. PATENT DOCUMENTS

| 8,422,119 | B1* | 4/2013 | Keaton | G02F 1/35 372/101 |
| 2006/0028935 | A1* | 2/2006 | Mori | G11B 7/1398 |
| 2007/0236771 | A1* | 10/2007 | Zadoyan | H01S 3/127 359/257 |
| 2007/0258688 | A1* | 11/2007 | Clubley | G02F 1/3501 385/128 |
| 2012/0120481 | A1* | 5/2012 | Armstrong | G02F 1/37 359/328 |
| 2016/0282702 | A1 | 9/2016 | Swanbeck et al. | |

FOREIGN PATENT DOCUMENTS

| CN | 203606583 U | 5/2014 |
| DE | 102 55 303 A1 | 6/2004 |
| EP | 0075435 A2 | 3/1983 |

* cited by examiner

ELECTRO-OPTIC MODULATOR

This application is the U.S. National Stage of International Application No. PCT/GB2018/051621, which was filed on Jun. 13, 2018. This application also claims the benefit of the filing date of GB patent application No. 1710423.3, which was filed on Jun. 29, 2017. The contents of both of those applications are hereby incorporated by reference.

The present invention relates to the field of nonlinear optics and in particular to an electro-optic modulator (EOM) that is suited for use within a laser cavity as an intracavity, frequency modulating element.

An electro-optic modulator (EOM) is a device which can be employed for controlling the power, phase or polarisation of a laser beam via an electrical control signal. It typically comprises a nonlinear crystal through which the laser beam can propagate. Depending on its particular application, additional optical elements may also be present e.g. one or more polarisers. The principle of operation is based on the linear electro-optic effect (also called the Pockels effect), i.e. the modification of the refractive index of the nonlinear crystal by an electric field, in proportion to the strength of the electric field.

Frequently employed nonlinear crystal materials for EOMs are potassium di-deuterium phosphate (KDP), potassium titanyl phosphate (KTP), β-barium borate (BBO), lithium niobate ($LiNbO_3$), lithium tantalate ($LiTaO_3$), ammonium dihydrogen phosphate ($NH_4H_2PO_4$, ADP) and rubidium titanyl phosphate (RTP).

As discussed above, the phase induced on the laser beam by the nonlinear crystal of the EOM changes in proportion to the strength of the electric field applied across the crystal. As a result, the refractive index, and hence the optical path length experienced by a laser beam propagating through the crystal also changes in proportion to the strength of the electric field. When the optical path length of the nonlinear crystal changes by an amount equal to half of the wavelength of the laser beam then the phase change experienced by the laser beam is equal to π.

The voltage required for inducing a phase change of π within an EOM is called the half-wave voltage ($V_\pi$). For the above described EOMs, the half-wave voltage ($V_\pi$) is usually hundreds or even thousands of volts, so that a high-voltage amplifier is required. Suitable electronic circuits can switch such large voltages within a few nanoseconds, allowing the EOMs to be employed as fast optical switches. In other cases, a modulation with smaller voltages is sufficient, e.g. when only a small amplitude or phase modulation is required.

When an EOM is employed as an intracavity component within a laser cavity it is known to introduce an associated optical loss to the system. For example, optical surfaces within a laser cavity are predominantly Brewster-angled and thus a polarisation-dependent loss. Nonlinear crystal materials generally have some residual birefringence (stress- or thermally-induced) which causes rotation of the polarisation state which in turn leads to losses at the Brewster-angled surfaces. A single nonlinear crystal of an EOM can result in a power drop in the output of the laser cavity of ~10%, or more EOMs are attractive for use within optical systems due to their inherent high-speed response times. However, when these devices are driven by an electric field at frequencies above 100 kHz piezoelectric effects of the crystals causes the crystals to resonate thus inducing noise and large phase errors within the associated optical systems. For many laser systems, these piezoelectric effects limit the frequency at which the nonlinear crystals can be driven by an electric field to around 600 kHz.

The introduction and removal of the EOM also results in a deviation being experienced by the intracavity field thus requiring a significant degree of skill and effort to be expended by the skilled man in order to realign the laser cavity each time such an event occurs.

SUMMARY OF INVENTION

It is therefore an object of an embodiment of the present invention to obviate or at least mitigate the foregoing disadvantages of the electro-optic modulator (EOM) known in the art.

According to a first aspect of the present invention there is provided an electro-optic modulator (EOM) suitable for altering an optical path length of an optical field, the electro-optic modulator (EOM) comprising:
a first Brewster-angle cut nonlinear crystal having a first optical axis;
a second Brewster-angle cut nonlinear crystal having a second optical axis;
wherein, the first and second optical axes are orientated relative to each other such that when the optical field propagates through the first and second Brewster-angle cut nonlinear crystals the optical field experiences no overall deviation; and
the first and second Brewster-angle cut nonlinear crystals are arranged to be opposite handed relative to the optical field.

Opposite handed means that an optical field propagating through the first and second nonlinear crystals will enter, and exit, the first and second nonlinear crystals via different polished faces. As a result of the opposite handed manner of the first and second nonlinear crystals, the EOM has the advantage that its associated optical losses are significantly lower when compared with those EOMs known in the art since any the optical loss effects induced by the first nonlinear crystal are negated by those induced by the second nonlinear crystal. Having no overall deviation experienced by an optical field when propagating through the EOM means that the EOM can be inserted into, or removed from, an optical system within which it is deployed (e.g. a laser system) without any deviation being imparted onto the optical field. This reduces the levels of skill and effort required on the part of an operator since there is a reduced requirement for realignment of the system when the EOM is inserted or removed.

According to a second aspect of the present invention there is provided an electro-optic modulator (EOM) suitable for altering an optical path length of an optical field, the electro-optic modulator (EOM) comprising:
a first Brewster-angle cut nonlinear crystal having a first light input axis and a first light output axis;
a second Brewster-angle cut nonlinear crystal having a second light input axis and a second light output axis;
wherein
the first light output axis is coincident with the second light input axis between the first and second Brewster-angle cut nonlinear crystals; and
the first and second Brewster-angle cut nonlinear crystals are arranged to be opposite handed relative to the optical field propagating through the first and second Brewster-angle cut nonlinear crystals.

Having the first light output axis coincident with the second light input axis between the first and second Brewster-angle cut nonlinear crystals has the advantage that no deviation is experienced by an optical field when the EOM is inserted into, or removed from, an optical system within which it is deployed e.g. a laser system. This reduces the levels of skill and effort required on the part of an operator since there is a reduced requirement for realignment of the system when the EOM is inserted or removed.

The EOM preferably further comprises first and second electrical coatings located on opposite surfaces of the first Brewster-angle cut nonlinear crystal. The EOM may comprise first and second electrical coatings located on opposite surfaces of the second Brewster-angle cut nonlinear crystal. The electrical coatings provide a means for a voltage to be applied across the first and or second nonlinear crystals. Preferably the electrical coatings comprise gold coatings.

Preferably, the first and second Brewster-angle cut nonlinear crystals are made from a nonlinear material selected from a set of nonlinear materials comprising potassium di-deuterium phosphate (KDP), potassium titanyl phosphate (KTP), β-barium borate (BBO), lithium niobate ($LiNbO_3$), lithium tantalate ($LiTaO_3$), ammonium dihydrogen phosphate ($NH_4H_2PO_4$, ADP) and rubidium titanyl phosphate (RTP).

Most preferably the first and second Brewster-angle cut nonlinear crystals are made from the same material.

The EOM may further comprise a mounting apparatus that provides a means for locating the first and second Brewster-angle cut nonlinear crystals.

The mounting apparatus preferably comprises a first clamp section having one or more adjustable crystal holders. The one or more adjustable crystal holders may comprise first and second plates that locate with opposite sides of a nonlinear crystals. Preferably the first and second plates are made from a metal alloy e.g. brass. Employing a metal alloy provides a means for an electrical supply to be provided to a nonlinear crystal when located within the one or more adjustable crystal holders.

Most preferably the first plates are adjustably mounted. Employing adjustably mounted first plates provides a means to adjust their position to assist with locating a nonlinear crystal. The adjustability also allows a user to release pressure from the first plate once bonded to the nonlinear crystal to avoid inducing stress on the nonlinear crystal.

Most preferably the second plates have their positions rigidly fixed. This arrangement allows the adjustable crystal holders to rigidly fix the position of a nonlinear crystal when located within the one or more adjustable crystal holders The mounting apparatus preferably comprises a first electrically insulating base plate attached to the first clamp section. The preferred material for the first electrically insulating base plate is ceramic.

Located on a surface of the first electrically insulating base plate may be one or more crystal locators. The one or more crystal locators may comprise a ridge. The one or more crystal locators provide an accurate means for registering the position of the nonlinear crystals within their respective adjustable crystal holders.

Most preferably a layer of a non-hardening or flexible adhesive is employed to attach the first and second nonlinear crystals to the first electrically insulating base plate. A first layer of solder is employed to attach the first and second nonlinear crystals to the first plates of the adjustable crystal holders. Similarly, a second layer of solder is employed to attach the first and second nonlinear crystals to the second plates of the adjustable crystal holders.

This arrangement results in no stress being applied to the nonlinear crystals which would induce unwanted birefringence. Furthermore, the adhesive layer provides a means for dampening piezoelectric effects induced upon of the nonlinear crystals when driven by an electric field applied between the electrical coatings. This arrangement allows the nonlinear crystals to be driven with electric field drive frequencies of 10 MHz and above.

Preferably the mounting apparatus further comprises a second electrically insulating base plate upon which the first clamp section is located. The second electrically insulating base plate may comprise one or more apertures. The preferred material for the second electrically insulating base plate is ceramic. One or more bolts threaded through the apertures may provide a means for attaching the EOM to an optical system, e.g. a laser system.

The mounting apparatus may further comprise a second clamp section releasably connected to the first clamp section. One or more bolts threaded through one or more apertures in the first and second clamp sections may provide a means for releasably connecting the first clamp section to the second clamp section.

The one or more bolts may also provide a means for attaching the clamp to the second base plate. Alternatively, the clamp is attached to the second base plate by an adhesive.

The second clamp section may comprise one or more adjustable connectors that provide a means for applying a pressure to an electrically insulating top plates located with a surface of the nonlinear crystals.

The EOM may further comprise a wire that provides a means for supplying the required electrical field to the first and or second nonlinear crystals.

According to a third aspect of the present invention there is provided a laser system comprising an electro-optic modulator (EOM) in accordance with the first or second aspects of the present invention.

Embodiments of the third aspect of the present invention may comprise features to implement the preferred or optional features of the first or second aspects of the invention or vice versa.

According to a fourth aspect of the present invention there is provided a method of producing an electro-optic modulator (EOM) suitable for altering an optical path length of an optical field the method comprising:
  providing a first Brewster-angle cut nonlinear crystal having a first optical axis;
  providing a second Brewster-angle cut nonlinear crystal having a second optical axis,
  orientating the first and second optical axes relative to each other such that when the optical field propagates through the first and second Brewster-angle cut nonlinear crystals the optical field experiences no overall deviation;
  arranging the first and second Brewster-angle cut nonlinear crystals to be opposite handed relative to the optical field.

According to a fifth aspect of the present invention there is provided a method of producing an electro-optic modulator (EOM) suitable for altering the optical path length of an optical field the method comprising:
  providing a first Brewster-angle cut nonlinear crystal having a first light input axis and a first light output axis;
  providing a second Brewster-angle cut nonlinear crystal having a second light input axis and a second light output axis;
  locating the first light output axis to be coincident with the second light input axis between the first and second Brewster-angle cut nonlinear crystals; and arranging the first and second Brewster-angle cut nonlinear crystals to be opposite handed relative to the optical field.

Preferably the provision of the first and or second Brewster-angle cut nonlinear crystals may comprise providing electrical coatings to opposite sides of the first and or second Brewster-angle cut nonlinear crystals Preferably the provision of the first and or second Brewster-angle cut nonlinear crystals may comprise locating the first and or second Brewster-angle cut nonlinear crystals within a first and or second adjustable crystal holders.

Locating the first and or second Brewster-angle cut nonlinear crystals within the first and or second adjustable crystal holder preferably comprises applying a layer of a non-hardening or flexible adhesive between a surface of the first and or second Brewster-angle cut nonlinear crystals and a non-electrically conducting surface of the first and or second adjustable crystal holders.

Preferably locating the first and or second Brewster-angle cut nonlinear crystals within the first and or second adjustable crystal holder further comprises applying a layer of solder between the electrical coatings and a non-rigidly fixed plate of the first and or second adjustable crystal holders.

Preferably locating the first and or second Brewster-angle cut nonlinear crystals within the first and or second adjustable crystal holder further comprises applying a layer of solder between the electrical coatings and a rigidly fixed plate of the first and or second adjustable crystal holders.

Most preferably, the non-rigidly fixed plates of the first and or second adjustable crystal holder are moveable to provide a means temporarily securing the first and or second Brewster-angle cut nonlinear crystals within the first and or second adjustable crystal holders.

Optionally a wire may be connected to the electrical coatings to provide an electrical field to the first or second nonlinear crystals.

Preferably locating the first and or second Brewster-angle cut nonlinear crystals within the first and or second adjustable crystal holders comprise applying a mechanical pressure to the first and or second Brewster-angle cut nonlinear crystals. This applied pressure can be employed as an alternative or an additional means to control the electro-optic effect of the first and or second Brewster-angle cut nonlinear crystals. Alternatively, the applied pressure can be employed to help suppress the piezo-electric resonances of the nonlinear crystals.

Embodiments of the fourth and fifth aspects of the present invention may comprise features to implement the preferred or optional features of the first to third aspects of the invention or vice versa.

According to a sixth aspect of the present invention there is provided a mount for a crystal the mount comprising a first base plate and a rigidly fixed side plate wherein,
a first layer of solder is employed to attach a first surface of the crystal to the rigidly fixed side plate and
a layer of a non-hardening or flexible adhesive is employed to attach a second surface of the crystal to the first base plate.

Most preferably, the first layer of solder attaches to the first surface of the crystal via a first electrical coating.

The mount preferably further comprises a non-rigidly fixed side plate, located opposite to the rigidly fixed side plate. A second layer of solder is preferably employed to attach a third surface of the crystal to the non-rigidly fixed side plate. Most preferably, the second layer of solder attaches to the third surface of the crystal via a second electrical coating.

Preferably the rigidly fixed plate is made from a metal alloy e.g. brass. Similarly, the non-rigidly fixed plate is preferably made from a metal alloy. Employing a metal alloy provides a means for an electrical field to be provided to the crystal when located within mount.

Located on a surface of the first base plate may be one or more crystal locators. The one or more crystal locators may comprise a ridge. The one or more crystal locators provide an accurate means for registering the position of the crystals within the mount.

Preferably the first base plate comprises a non-electrically conducting material e.g. a ceramic.

The rigidly fixed side plate may be integrated within a first clamp section. In this embodiment, the first base plate is preferably located on the first clamp section.

The mount may further comprise an electrically insulating plate attached to the first clamp section. The preferred material for the electrically insulating plate is ceramic. The electrically insulating plate may comprise one or more apertures. One or more bolts threaded through the apertures may provide a means for attaching the mount to an optical system.

The mount may further comprise a second clamp section releasably connected to the first clamp section. One or more bolts threaded through one or more apertures in the first and second clamp sections may provide a means for releasably connecting the first clamp section to the second clamp section.

The second clamp section may comprise one or more adjustable connectors that provide a means for applying a pressure to an electrically insulating top plate located with a surface of the crystals.

The mount may further comprise a wire that provides a means for supplying an electrical field to the crystal.

Embodiments of the sixth aspect of the present invention may comprise features to implement the preferred or optional features of the first to fifth aspects of the invention or vice versa.

According to a seventh aspect of the present invention there is provided a method of mounting a crystal the method comprising
providing a first base plate and a rigidly fixed side plate
applying a first layer of solder to attach a first surface of the crystal to the rigidly fixed side plate and
applying a layer of a non-hardening or flexible adhesive to attach a second surface of the crystal to the first base plate.

Most preferably, the first layer of solder is applied to the first surface of the crystal via a first electrical coating.

The method preferably further comprises providing a non-rigidly fixed side plate, located opposite to the rigidly fixed side plate. A second layer of solder is preferably applied to attach a third surface of the crystal to the non-rigidly fixed side plate. Most preferably, the second layer of solder attaches to the third surface of the crystal via a second electrical coating.

The method may further comprise located on a surface of the first base one or more crystal locators.

Optionally providing the rigidly fixed side plate may comprises providing a first clamp section integrated within which is the rigidly fixed side plate. In this embodiment, the first base plate is preferably provided on the first clamp section.

The method may further comprise attaching an electrically insulating plate to the first clamp section.

The method may further comprise providing a second clamp section releasably connected to the first clamp section.

The method may comprise providing the second clamp section with one or more adjustable connectors that provide a means for applying a pressure to an electrically insulating top plate located with a surface of the crystals.

The method may further comprise providing a means for supplying an electrical field to the crystal.

Embodiments of the seventh aspect of the present invention may comprise features to implement the preferred or optional features of the first to sixth aspects of the invention or vice versa.

BRIEF DESCRIPTION OF DRAWINGS

Aspects and advantages of the present invention will become apparent upon reading the following detailed description and upon reference to the following drawings in which.

Figure 1:
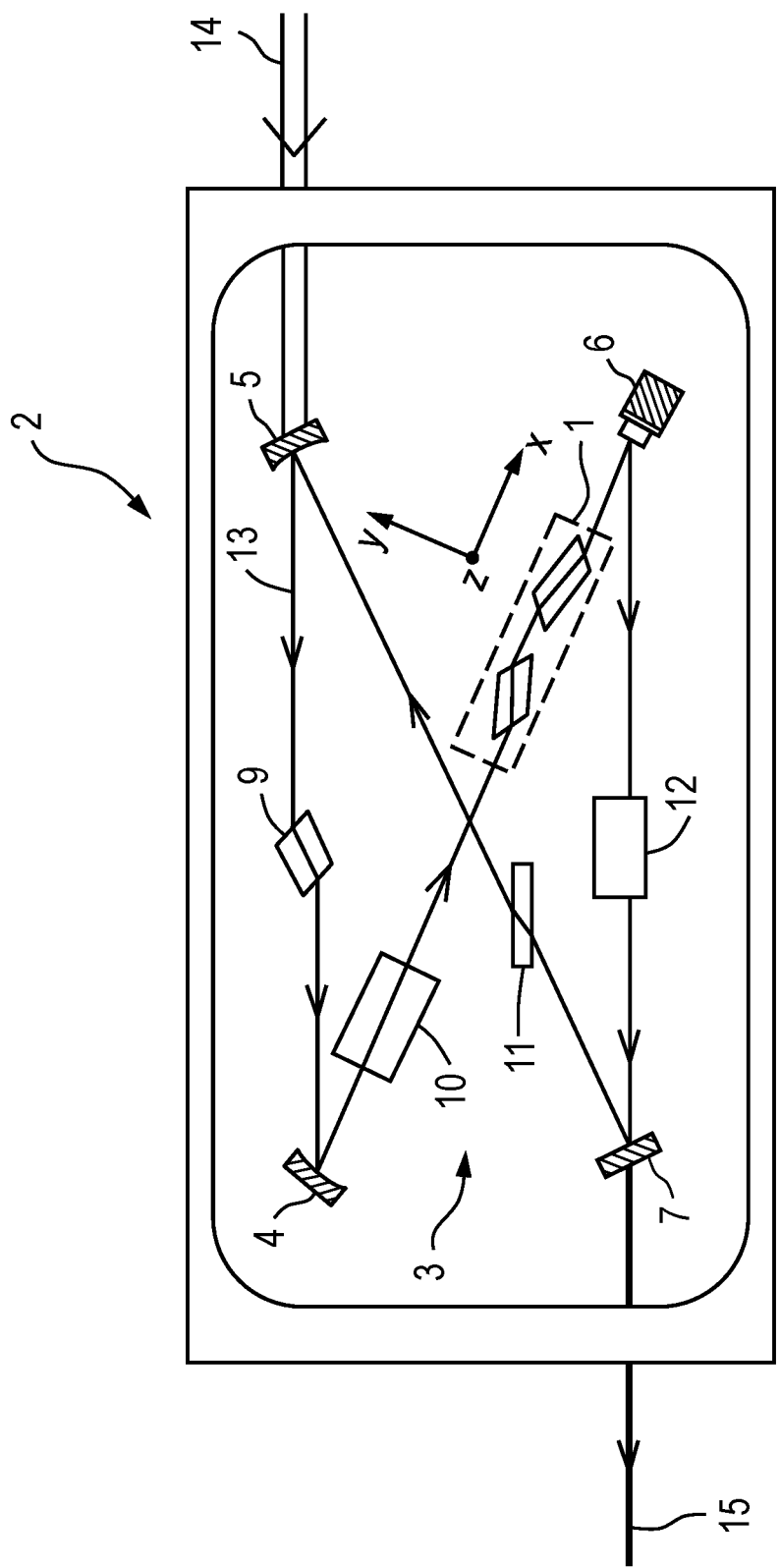
FIG. 1 presents a schematic representation of a Ti:Sapphire laser that incorporates an electro-optic modulator (EOM) in accordance with an embodiment of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Figure 3:
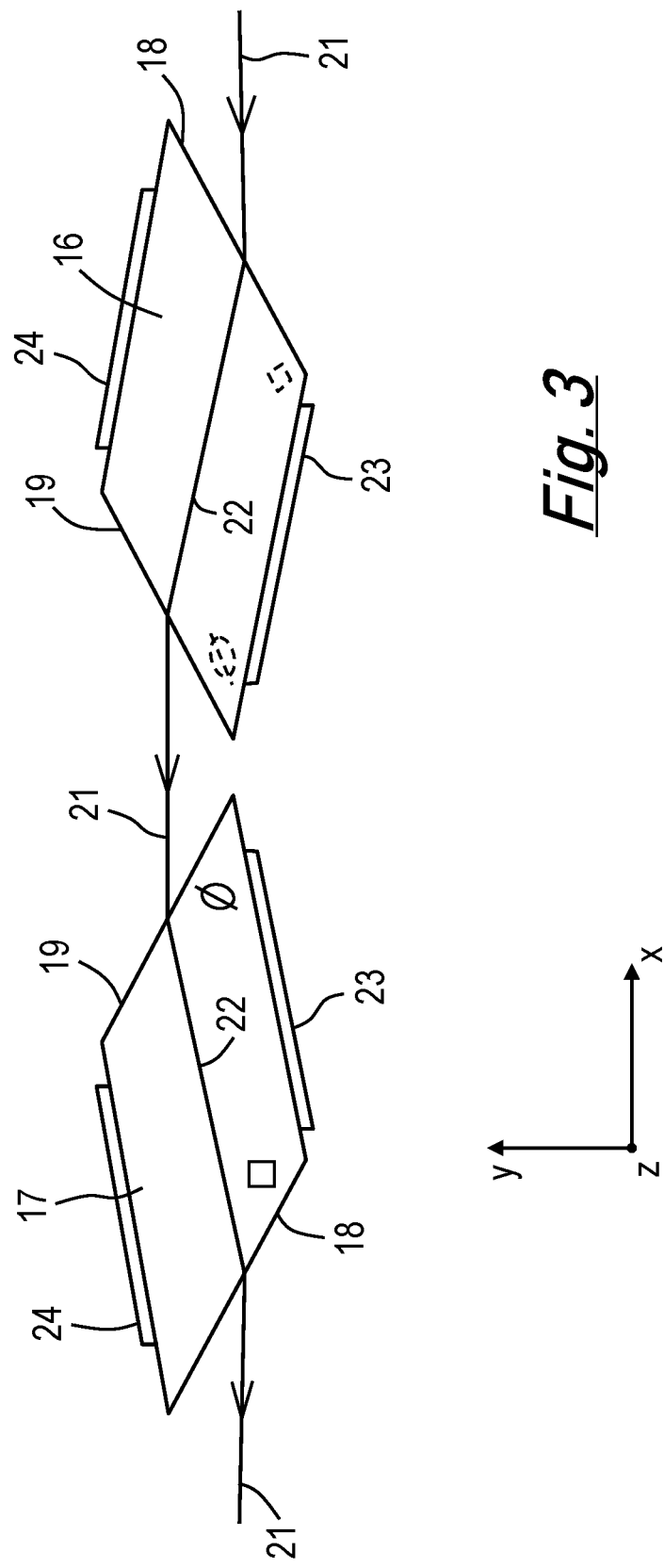
FIG. 3 presents a schematic top view of the electro-optic modulator (EOM) of FIG. 1 incorporating the two Brewster-angle cut nonlinear crystal of FIG. 2.
Figure 4:
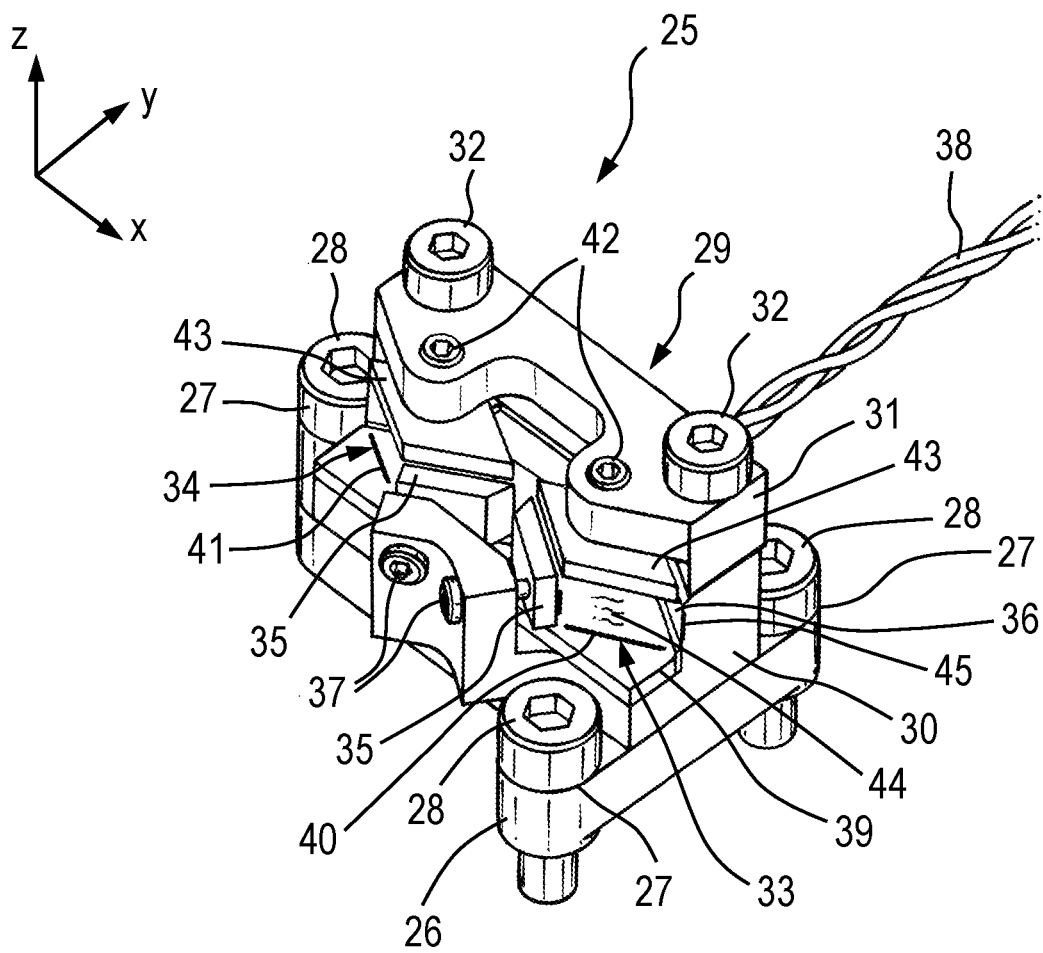
FIG. 4 provides a schematic perspective view of electro-optic modulator (EOM) within a mounting apparatus.

An electro-optic modulator (EOM) 1, in accordance with an embodiment of the present invention will now be described with reference to FIGS. 1 to 4. In particular, FIG. 1 presents a schematic representation of a Ti:Sapphire laser 2 that incorporates the electro-optic modulator (EOM) 1, while FIGS. 3 and 4 present a schematic top view, and a schematic perspective view, respectively, of the electro-optic modulator (EOM) 1 in isolation. Axes are provided within the Figure to assist with clarity of understanding.

In the embodiment of FIG. 1, the laser 2 can be seen to comprise a laser cavity 3 that exhibits a bow-tie ring cavity geometry defined by a first mirror 4, a second mirror 5, a dual piezo-actuated mirror 6 (of the type described within UK patent number GB 2,499,471 B) and an output coupler 7 all of which are located within a mechanically stable housing 8. Located within the cavity 3 is a Ti:Sapphire gain medium 9 (between the first 4 and second 5 mirrors); an optical diode 10 and the EOM 1 (between the first 4 and the dual piezo-actuated 6 mirrors); a birefringent filter (BRF) 11 (between the second mirror 5 and the output coupler 7); and an air-spaced etalon 12 (between the piezo-actuated mirror 6 and the output coupler 7). It is a combination of the ring cavity geometry and the optical diode 10 that forces the laser cavity 3 to operate in a unidirectional manner, resulting in a travelling intracavity optical field 13 that removes the detrimental effects of spatial-hole burning within the gain medium 9.

Given that the optical absorption within Ti:Sapphire occurs over a broad wavelength range from ~400 nm to ~600 nm, the gain medium 9 can be optically pumped by any commercially available continuous-wave "green" laser 14 e.g. a 532 nm diode pumped solid-state laser source (not shown). Pumping of the gain medium 9 preferably takes place through the second mirror 5.

In order to tune the wavelength of laser output 15, the intracavity BRF 11 is employed. The BRF 11 introduces a wavelength-dependent loss into the cavity 3, and wavelength tuning is accomplished by rotation of the BRF 11. The BRF 11 provides a relatively rapid but coarse wavelength adjustment. In the absence of any further linewidth narrowing techniques the laser output 15 exhibits a linewidth of ~8 GHz.

The introduction of the air-spaced etalon 12 to the laser cavity 3 acts to further narrow the linewidth operation of the laser 2. This is because the air-spaced etalon 12 introduces a spectral loss into the cavity 3 that has a narrower transmission bandwidth than that exhibited by the BRF 11. By electronically adjusting the spacing of the air-spaced etalon 12 the laser output 15 can also be finely tuned. Long-term single mode operation for the laser cavity 3 can also be achieved through the electronic servo locking of the intracavity air-spaced etalon 12, a technique known to those skilled in the art. This technique involves locking the peak of the air-spaced etalon's 12 transmission function to the nearest cavity 3 longitudinal mode (within the capture range of the servo loop) by dithering the spacing of the air-spaced etalon 12. In the absence of any further linewidth narrowing techniques, the laser output 15 exhibits a linewidth of ~5 MHz.

The dual piezo-actuated mirror 6 comprise a first and second piezoelectric crystals. The thickness of the second piezoelectric crystal is less than the thickness of the first piezoelectric crystal. With this arrangement the dual piezo-actuated mirror 6 provides a means for maintaining a single longitudinal mode operation as the laser frequency is tuned since accurate control of the first, thicker piezoelectric crystal of the duel piezo-actuated mirror 6 allows the cavity length to be changed precisely, and to be to match the single oscillating longitudinal cavity mode frequency as the cavity length is tuned. With the air-spaced etalon 12 peak lock circuit engaged, the peak transmission of the air-spaced etalon 12 is then kept locked to this oscillating longitudinal mode frequency (to within the capture range of the locking circuit), even as this frequency is tuned by the dual piezo-actuated mirror 6. The combination of the first and second piezoelectric crystals of the dual piezo-actuated mirror 6 can also be employed to lock the laser cavity to an external reference cavity (not shown) which reduce the laser line width to around ~10 kHz.

The introduction of the EOM 1 to the laser cavity 3 acts to further narrow the linewidth operation of the laser output 15. This is because of the extremely fast response times of the nonlinear crystals contained within the EOM 1 which allows the laser output 15 to exhibit a linewidth of below a Hertz. By electronically adjusting the EOM 1 the laser output 15 can also be finely tuned in the range 0+/−750 kHz. As a direct result of these narrow linewidths the applicants have been able to demonstrate phase locking of two Ti:Sapphire lasers 2.

Figure 2:
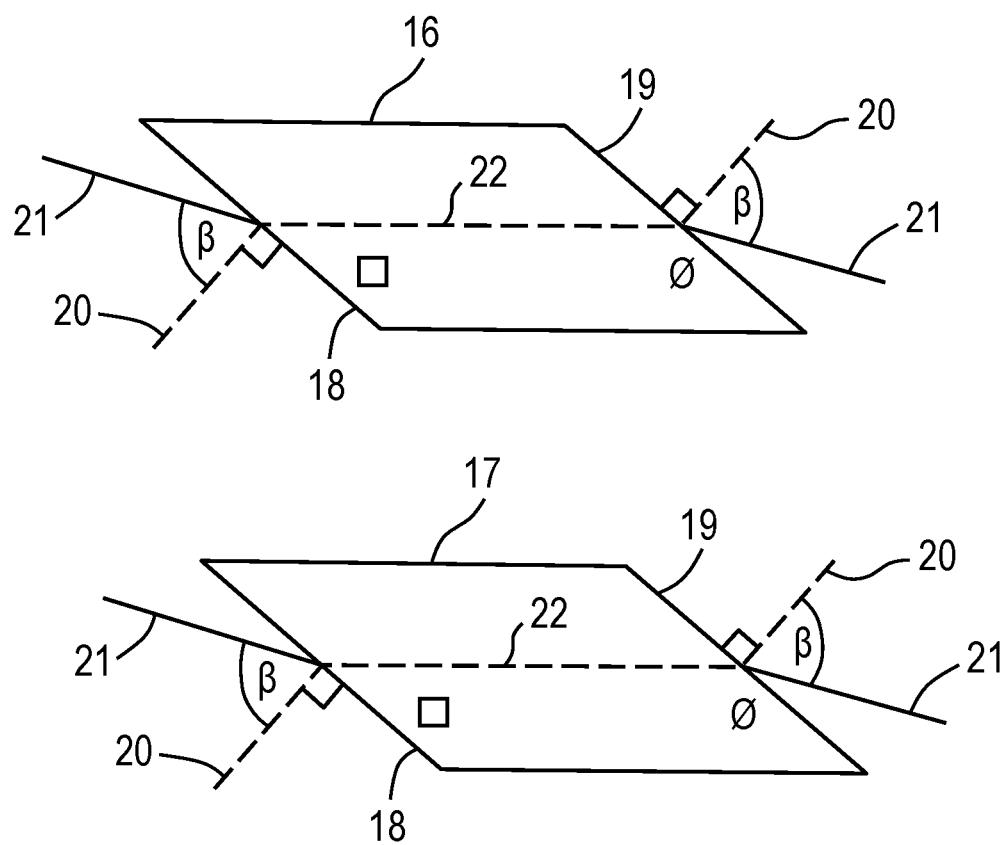
FIG. 2 presents a schematic top view of two Brewster-angle cut nonlinear crystal employed within the electro-optic modulator (EOM) of FIG. 1.

FIG. 2 presents a schematic a first top view of a first nonlinear crystal 16 and a second nonlinear crystal 17 employed within the electro-optic modulator (EOM) of FIG. 1. It is preferable for the nonlinear crystals 16 and 17 to be made from the same material which in the presently described embodiment is rubidium titanyl phosphate (RTP). It will however be appreciated that any other nonlinear materials that exhibits a linear electro-optic effect may alternatively be employed for the nonlinear crystals 16 and 17 within the EOM 1.

Nonlinear crystals are generally grown in boules by a number of well-known techniques e.g. the Bridgman technique and the Czochralski process. These methods typically result in a cylindrical rod of material having a defined optical axis. The cylindrical rod is then cut and polished relative to the optical axis to produce the desired length and shape of nonlinear crystal.

Both of the nonlinear crystals 16 and 17 are Brewster-angle cut crystals i.e. they have polished faces 18 and 19 defined by their relative positions along the optical axis of the crystal boule from which they were produced. The polished faces 18 and 19 are located at Brewster's angle ($\beta$) between a normal vector 20 of the polished faces 18 and 19 and an axis of light input 21 for the nonlinear crystals 16 and 17. For ease of reference an optical axis for each of the nonlinear crystals 16 and 17 is represented by reference numeral 22. At Brewster's angle ($\beta$), the surface reflectance of the polished faces 18 and 19 is zero for the light with polarization inside the plane defined by the x and y axes (also defined as p-polarized light). To assist the following description of the EOM 1 the top surface of both the nonlinear crystals 16 and 17 are marked with an " " near to the first polished faces 18 and with an "Ø" near to the second polished faces 19.

FIG. 3 presents a schematic top view of the electro-optic modulator (EOM) of FIG. 1 incorporating the two Brewster-angle cut nonlinear crystal of FIG. 2. It should be noted that the " " near to the first polished faces 18 and the "Ø" near to the second polished faces 19 within the first nonlinear crystal 16 are marked by dashed lines to highlight the fact that they are now on the lower surface of first nonlinear crystal 16 i.e. the first nonlinear crystal 16 has been rotated through 180°, about an axis perpendicular to the optical axis 22 relative to the second nonlinear crystal 17, when compared with the configuration of these crystals presented in FIG. 2.

The nonlinear crystals 16 and 17 are located within the EOM 1 such that the light output axis 21 of the first nonlinear crystal 16 is coincident with the light input axis 21 of the second nonlinear crystal 17 between nonlinear crystals 16 and 17. The nonlinear crystals 16 and 17 are also mounted opposite handed within the EOM 1. Opposite handed means that an optical field 13 propagating through the nonlinear crystals 16 and 17 will enter, and exit, the nonlinear crystals 16 and 17 via different polished faces 18 and 19. By way of example, and with reference to FIG. 3, an optical field 13 arranged to propagate along the axis of light input 21 in the direction presented by the arrow will enter the first nonlinear crystal 16 via polished face 18 and exit via polished face 19. By contrast, as the optical field 13 continues to propagate through the EOM 1 it will enter the second nonlinear crystals 17 via polished surface 19 before exiting the second nonlinear crystals 17 via polished surface 18.

The nonlinear crystals 16 and 17 are provided with electrical coatings 23 and 24 applied to the side surfaces thereof. In the presently described embodiment the electrical coatings 23 and 24 comprise gold coatings. The electrical coatings 23 and 24 provide a means for a voltage to be applied across the first nonlinear crystals 16. A voltage applied across the nonlinear crystals 16 is found to induce a frequency shift on the propagating optical field 13 on the order of 75 kHz/V.

It will be appreciated by the skilled reader that a voltage could be applied to the electrical coatings 23 and 24 provided on the side surfaces of both the first nonlinear crystals 16 and the second nonlinear crystal 17. However, because the nonlinear crystals 16 and 17 are mounted to be opposite handed, relative to the optical field 13 propagating through the EOM 1, a voltage should not be applied simultaneously across both nonlinear crystals 16 and 17 as the induced electro-optic effects would be in the opposite sense and thus act to cancel each other out. However, it will be further appreciated by the skilled reader that if the voltage applied to the first nonlinear crystal 16 and the second nonlinear crystal 17 is also in the opposite sense then the induced electro-optic effects can be doubled.

Method of Producing the Electro-Optic Modulator

A method of producing the EOM 1 will now be described with reference to FIG. 4. In particular FIG. 4 presents a mounting apparatus, generally depicted by reference numeral 25, for mechanically mounting the nonlinear crystals 16 and 17 within the EOM 1.

The mounting apparatus 25 can be seen to comprise an electrically insulating base plate 26 having three apertures 27. The preferred material for the electrically insulating base plate 26 is ceramic. Bolts 28 are presented in FIG. 4, shown threaded through the apertures 27, which provide a means for attaching the EOM 1 to the housing 8 of the laser cavity 3.

Located on top of the base plate 26 is a clamp 29 comprising first 30 and second 31 sections. The first 30 and second 31 clamp sections are preferably made from a metal alloy, for example brass. Bolts 32 threaded through the apertures in the first 30 and second 31 clamp sections provide a means for securing the first clamp section 30 to the second clamp section 31. An adhesive is employed to attach the clamp 29 to the base plate 26.

The first clamp section 30 can be seen to comprises first 33 and second 34 adjustable crystal holders. The adjustable crystal holders 33 and 34 comprise plates 35 and 36 which locate with opposite sides of the nonlinear crystals 16 and 17. Preferably the plates 35 and 36 are also made from a metal alloy, for example brass, to provide an electrical connection for a nonlinear crystal 16 and 17 when the nonlinear crystals 16 and 17 are located within the adjustable crystal holders 33 and 34. The first plates 35 are mounted on a threaded screw 37 so that their positions can be adjusted in order to assist with mounting of the nonlinear crystals 16 and 17 in the adjustable crystal holders 33 and 34, as described in further detail below. By contrast, the second plates 36 are preferably formed as an integrated component of the first clamp section 30 to provide them with the desired rigidity.

A wire 38 provides a means for supplying the required electrical field to the electrical coatings 23 and 24 located upon the side surfaces of the nonlinear crystal 16 when located within the adjustable crystal holder 33. In particular, the wire 38 provides an electrical supply between the plates 35 and 36 of the adjustable crystal holders 33 and 34.

The mounting apparatus 25 further comprises an electrically insulating base plate 39 located on top of the first clamp section 30. The preferred material for the electrically insulating base plate 39 is ceramic. Located on the top surface of the electrically insulating base plate 39 are first 40 and second 41 crystal locators in the form of a ridge. When the electrically insulating base plate 39 is located on top of the first clamp section 30 then the first 40 and second 41 crystal locators provide an accurate means for registering the position the nonlinear crystals 16 and 17 within their respective adjustable crystal holders 33 and 34.

The second clamp section 31 can be seen to further comprise two threaded screws 42 that protrude from the underside of the second clamp section 31. The threaded screws 42 provide a means for applying a pressure to electrically insulating top plates 43 located with the upper surfaces of the nonlinear crystal 16 and 17.

The following methodology is employed to locate the nonlinear crystals 16 and 17 within the adjustable crystal holders 33 and 34. In the first instance, the threaded screws 37 are loosened to move the first plates 35 away from the second plates 36 to provide sufficient clearance for the nonlinear crystals 16 and 17 to be placed within the adjustable crystal holders 33 and 34.

The wire 38 may then be connected to provide an electrical supply between the first plates 35 and the second plates 36.

Next, the electrically insulating base plate 39 is located on top of the first clamp section 30 to locate the first 40 and second 41 crystal locators within their respective adjustable crystal holders 33 and 34.

An adhesive layer 44 is then applied to the top surface of the electrically insulating base plate 39 in the areas where the nonlinear crystals 16 and 17 are to be positioned. The adhesive layer 44 comprises a non-hardening or flexible adhesive.

A layer of solder 45 is then located on the internal faces of the first 35 and second plates 36.

The nonlinear crystals 16 and 17 are then located within their respective adjustable crystal holders 33 and 34 such that polished faces 18 abut with the first 40 and second 41 crystal locators. At this time the adhesive layers 44 are sandwiched between the lower surface of the nonlinear crystals 16 and 17 and the upper surface of the electrically insulating base plate 39. Similarly, the layers of solder 45 are sandwiched between the side surfaces of the nonlinear crystals 16 and 17 and the inner surfaces of the first 35 and second plates 36.

The threaded screws 37 are then tightened to move the first plates 35 towards the second plates 36 to temporarily secure the nonlinear crystals 16 and 17 within the adjustable crystal holders 33 and 34.

The electrically insulating top plates 43 are then located with the upper surfaces of the nonlinear crystal 16 and 17 before the first camp section 30, the second clamp section 31 and the 26 are secured together by the bolts 32.

The mounting apparatus 25 is then be heated in order to melt the layers of solder 45 sandwiched between the side surfaces of the nonlinear crystals 16 and 17 and the inner surfaces of the first 35 and second plates 36.

Once the mounting apparatus 25 cools, the solder sets so as to fix the positions of the first 35 and second plates 36 to the electrical coatings 23 and 24 located upon the side surfaces of the nonlinear crystal 16 and 17. At this time, it is preferable to loosen the threaded screws 37 so that pressure is no longer being applied to the first plates 35.

The threaded screws 42 can then be adjusted so as to vary the pressure being applied by the electrically insulating top plates 43 to the top surfaces of the nonlinear crystals 16 and 17. This mounting arrangement provides a means for different orientations of pressure to be applied to the nonlinear crystals 16 and 17 which can be employed as an alternative or additional means to control their electro-optic effect.

Alternatively, the applied pressure can be employed to help suppress the piezo-electric resonances of the nonlinear crystals 16 and 17.

Bolts 28 can then be threaded through the apertures 27 in the base plate 26 to secure the EOM 1 in the desired position e.g. to attach the EOM 1 to the housing 8 of the laser cavity 3.

It will be appreciated that the above methodology is provided by way of example only and that some of the steps may be omitted or the steps described may be carried out in an alternative order.

The above described method of mounting the nonlinear crystals 16 and 17 has a number of inherent advantages for the operation of the EOM 1. In the first instance, it should be noted that once the threaded screws 37 have been loosened no pressure is applied to the nonlinear crystals 16 and 17 by soldered first plates 35. In addition, as the adhesive layer 44 comprises a non-hardening or flexible adhesive it also does not form a rigid bond with the nonlinear crystals 16 and 17. The nonlinear crystals 16 and 17 are however rigidly attached by the hardened solder to the second plates 36.

This arrangement results in no stress being applied to the nonlinear crystals 16 and 17 which would induce unwanted birefringence within the nonlinear crystals 16 and 17. Furthermore, the adhesive layer 44 provides a means for dampening piezoelectric effects induced upon of the nonlinear crystals 16 and 17 when driven by an electric field applied between the electrical coatings 23 and 24. The applicants have found that this arrangement removes the upper limit at which the nonlinear crystals can be driven and have operated the EOM 1 with electric field drive frequencies of 10 MHz and above.

The above described EOM 1 exhibits a number of advantages over those known in the art.

In the first instance employing two nonlinear crystals 16 and 17, mounted in an opposite handed manner, relative to the optical field 13 propagating through the nonlinear crystals 16 and 17 means that any optical loss effects induced by the nonlinear crystals 16 and 17 are negated and so results in significant reduction within the power loss experienced by the optical field 13. This reduction in optical losses is due to cancellation of the polarisation rotation effects introduced by the individual crystals. The applicants have also found there to be an improvement in the output beam quality when the nonlinear crystals are orientated with opposite handedness, especially at high intra-cavity powers. This is believed to be caused by cancellation between the nonlinear crystals of thermally-induced birefringence. In practice, this power loss has been reduced to ~2% when rubidium titanyl phosphate (RTP) nonlinear crystals 16 and 17 are employed.

Employing the "back to back" Brewster crystal arrangement has the further advantage that almost no beam deviation is experienced on the optical field 13 when the EOM 1 is inserted into, or removed from, the system within which it is deployed e.g. laser system 2. This reduces the levels of skill and effort required on the part of an operator since there is a reduced requirement for realignment of the system when the EOM 1 is inserted or removed.

The mounting apparatus 25 is also found to provide a highly stable environment for the reduce the nonlinear crystals 16 and 17. This is a result of the combined effects of the adhesive layers 44 and the layers of solder 45 associated with each of the nonlinear crystals 16 and 17 and, if present, pressure being applied by the electrically insulating top plates 43 to the top surfaces of the nonlinear crystals 16 and 17. As a result, the noise levels introduced by piezo-electric resonances within the EOM 1 are found to be strongly suppressed to the order of tens of kHz.

Being able to adjust the pressure applied by the electrically insulating top plates 43 to the top surfaces of the nonlinear crystals 16 and 17 provides the further advantage that these components can be employed to as a means for different orientations of pressure to be applied to the nonlinear crystals 16 and 17. Thus, applied pressure can be employed as an alternative, or additional means, to control the electro-optic effect of the nonlinear crystals 16 and 17. Alternatively, the applied pressure can be employed to help suppress the piezo-electric resonances of the nonlinear crystals 16 and 17.

A further point to note is that the EOM 1 design provides for the device to have a significantly smaller footprint when compared with other EOMs know in the art, typically around a third of the normal footprint of an EOM. This has obvious benefits to the miniaturisation of any laser, or other optical system within which it is deployed.

Although all of the above embodiments have been described with reference to a Ti:Sapphire laser system having a bow-tie ring cavity geometry, it will be appreciated by the skilled reader that the apparatus and techniques are not limited to use with such systems. These components could equally well be applied to any alternative laser cavity which employs the intracavity EOM 1 for locking and scanning purposes. Similarly, the described EOM 1 could be employed for alternative power, phase or polarisation control techniques of a laser beam as known to those skilled in the art.

An electro-optic modulator (EOM) suitable for altering an optical path length of an optical field is described. The EOM comprises first and second Brewster-angle cut nonlinear crystals having a first and second optical axis. The optical axes are orientated relative to each other such that when an optical field propagates through the nonlinear crystals it experiences no overall deviation. The nonlinear crystals are also arranged to be opposite handed relative to the optical field. As a result, the EOM has the advantage that its associated optical losses are significantly lower when compared with those EOMs known in the art. In addition, the EOM can be inserted into, or removed from, an optical system without any deviation being imparted onto the optical field. This reduces the levels of skill and effort required on the part of an operator. The described method and apparatus for mounting the nonlinear crystals also suppresses problematic piezo-electric resonances within the nonlinear crystals.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An electro-optic modulator (EOM) suitable for altering an optical path length of an optical field, the electro-optic modulator (EOM) comprising:
   a first Brewster-angle cut nonlinear crystal having a first light input axis and a first light output axis;
   a second Brewster-angle cut nonlinear crystal having a second light input axis and a second light output axis, wherein the first light output axis is coincident with the second light input axis between the first and second Brewster-angle cut nonlinear crystals and the first and second Brewster-angle cut nonlinear crystals are arranged to be opposite handed relative to the optical field propagating through the first and second Brewster-angle cut nonlinear crystals;
   a mounting apparatus that provides a means for locating the first and/or second Brewster-angle cut nonlinear crystals, the mounting apparatus comprising a first clamp section having one or more adjustable crystal holders and a first electrically insulating base plate attached to the first clamp section; and
   a layer of non-hardening or flexible adhesive employed to attach the first and/or second nonlinear crystals to the first electrically insulating base plate.

2. An electro-optic modulator (EOM) as claimed in claim 1 wherein the EOM further comprises first and second electrical coatings located on opposite surfaces of the first Brewster-angle cut nonlinear crystal.

3. An electro-optic modulator (EOM) as claimed in claim 1 wherein the EOM comprises first and second electrical coatings located on opposite surfaces of the second Brewster-angle cut nonlinear crystal.

4. An electro-optic modulator (EOM) as claimed in claim 1 wherein the first and second Brewster-angle cut nonlinear crystals are made from a nonlinear material selected from a set of nonlinear materials comprising potassium di-deuterium phosphate (KDP), potassium titanyl phosphate (KTP), β-barium borate (BBO), lithium niobate ($LiNbO_3$), lithium tantalate ($LiTaO_3$), ammonium dihydrogen phosphate ($NH_4H_2PO_4$, ADP) rubidium titanyl phosphate (RTP).

5. An electro-optic modulator (EOM) as claimed in claim 1 wherein the first and second Brewster-angle cut nonlinear crystals are made from the same material.

6. An electro-optic modulator (EOM) as claimed in claim 1 wherein the one or more adjustable crystal holders comprise first and second plates that locate with opposite sides of a nonlinear crystal.

7. An electro-optic modulator (EOM) as claimed in claim 6 wherein the first and second plates are made from a metal alloy.

8. An electro-optic modulator (EOM) as claimed in claim 6 wherein the first and second plates are adjustably mounted.

9. An electro-optic modulator (EOM) as claimed in claim 8 wherein the first and second plates are rigidly fixed.

10. An electro-optic modulator (EOM) as claimed in claim 1 wherein the first electrically insulating base plate comprises ceramic.

11. An electro-optic modulator (EOM) as claimed in claim 1 wherein the first electrically insulating base plate comprises one or more crystal locators.

12. An electro-optic modulator (EOM) as claimed in claim 11 wherein one or more crystal locators comprise a ridge located on a surface of the first electrically insulating base plate.

13. An electro-optic modulator (EOM) as claimed in claim 6 wherein a first layer of solder is employed to attach the first and second nonlinear crystals to the first plates of the adjustable crystal holders.

14. An electro-optic modulator (EOM) as claimed in claim 13 wherein a second layer of solder is employed to attach the first and second nonlinear crystals to the second plates of the adjustable crystal holders.

15. An electro-optic modulator (EOM) as claimed in claim 1 wherein the mounting apparatus further comprises a second electrically insulating base plate upon which the first clamp section is located.

16. An electro-optic modulator (EOM) as claimed in claim 15 wherein the second electrically insulating base plate comprises ceramic.

17. An electro-optic modulator (EOM) as claimed in claim 15 wherein the second electrically insulating base plate comprises one or more apertures.

18. An electro-optic modulator (EOM) as claimed in claim 17 wherein one or more bolts threaded through the apertures provide a means for attaching the EOM to an optical system.

19. An electro-optic modulator (EOM) as claimed in claim 1 wherein the mounting apparatus further comprises a second clamp section releasably connected to the first clamp section.

20. An electro-optic modulator (EOM) as claimed in claim 19 wherein one or more bolts threaded through one or more apertures in the first and second clamp sections provides a means for releasably connecting the first clamp section to the second clamp section.

21. An electro-optic modulator (EOM) as claimed in claim 20 wherein the one or more bolts also provide a means for attaching the clamp to the second base plate.

22. An electro-optic modulator (EOM) as claimed in claim 20 wherein the clamp is attached to the second base plate by an adhesive.

23. An electro-optic modulator (EOM) as claimed in claim 19 wherein the second clamp section comprises one or more adjustable connectors that provide a means for applying a pressure to an electrically insulating top plates located with a surface of the nonlinear crystals.

24. An electro-optic modulator (EOM) as claimed in claim 2 wherein he EOM further comprise a wire that provides a means for supplying the required electrical power to the first and or second electrical coatings.

25. A laser system comprising an electro-optic modulator (EOM) as claimed in claim 1.

26. A method of producing an electro-optic modulator (EOM) suitable for altering an optical path length of an optical field the method comprising:
providing a first Brewster-angle cut nonlinear crystal having a first light input axis and a first light output axis;
providing a second Brewster-angle cut nonlinear crystal having a second light input axis and a second light output axis;
locating the first light output axis to coincident with the second light input axis between the first and second Brewster-angle cut nonlinear crystals arranging the first and second Brewster-angle cut nonlinear crystals to be opposite handed relative to the optical field;
locating the first and/or second Brewster-angle cut nonlinear crystals within a first and/or second adjustable crystal holder; and
applying a layer of non-hardening or flexible adhesive between a surface of the first and/or second Brewster-angle cut nonlinear crystals and a non-electrically conducting surface of the first and/or second adjustable crystal holders.

27. A method of producing an electro-optic modulator (EOM) as claimed in claim 26 wherein the provision of the first and or second Brewster-angle cut nonlinear crystals comprises providing electrical coatings to opposite sides of the first and or second Brewster-angle cut nonlinear crystals.

28. A method of producing an electro-optic modulator (EOM) as claimed in claim 26 wherein locating the first and or second Brewster-angle cut nonlinear crystals within the first and or second adjustable crystal holder further comprises applying a layer of solder between the electrical coatings and a non-rigidly fixed plate of the first and or second adjustable crystal holders.

29. A method of producing an electro-optic modulator (EOM) as claimed claim 26 wherein locating the first and or second Brewster-angle cut nonlinear crystals within the first and or second adjustable crystal holder further comprises applying a layer of solder between the electrical coatings and a rigidly fixed plate of the first and or second adjustable crystal holders.

30. A method of producing an electro-optic modulator (EOM) as claimed in claim 28 wherein the non-rigidly fixed plates of the first or second adjustable crystal holder are moveable to provide a means temporarily securing the first and or second Brewster-angle cut nonlinear crystals within the first and or second adjustable crystal holders.

31. A method of producing an electro-optic modulator (EOM) as claimed in claim 26 wherein locating the first and or second Brewster-angle cut nonlinear crystals within the first and or second adjustable crystal holders comprise applying a mechanical pressure to the first and or second Brewster-angle cut nonlinear crystals.

32. A method of producing an electro-optic modulator (EOM) as claimed in claim 27 wherein a wire is connected to the electrical coatings to provide an electrical field to the first or second nonlinear crystal.

* * * * *